(12) United States Patent
Lobo (10) Patent No.: US 6,642,885 B2
(45) Date of Patent: Nov. 4, 2003

(54) RECEIVER FOR A SATELLITE BASED POSITION LOCATION SYSTEM

(75) Inventor: Natividade Albert Lobo, Windsor (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/149,242

(22) PCT Filed: Dec. 8, 2000

(86) PCT No.: PCT/GB00/04706

§ 371 (c)(1),
(2), (4) Date: Sep. 17, 2002

(87) PCT Pub. No.: WO01/42811

PCT Pub. Date: Jun. 14, 2001

(65) Prior Publication Data

US 2003/0058978 A1 Mar. 27, 2003

(51) Int. Cl.⁷ .............................................. H04B 7/185
(52) U.S. Cl. ........................... 342/357.12; 342/357.06; 701/213; 455/456.1
(58) Field of Search ....................... 342/357.12, 357.06; 701/213; 455/456.1

(56) References Cited

U.S. PATENT DOCUMENTS

| | | | |
|---|---|---|---|
| 4,601,005 A | | 7/1986 | Kilvington |
| 4,797,677 A | * | 1/1989 | MacDoran et al. ......... 342/352 |
| 5,420,592 A | | 5/1995 | Johnson |
| 5,781,156 A | | 7/1998 | Krasner |

FOREIGN PATENT DOCUMENTS

WO  WO99/38300  7/1999

* cited by examiner

Primary Examiner—Theodore M. Blum
(74) Attorney, Agent, or Firm—Antonelli, Terry, Stout & Kraus, LLP (57) ABSTRACT

The present invention provides a method for determining synchronisation of a signal received in a global positioning system receiver and transmitted by a global positioning system satellite, wherein the method comprises the steps of transform coding (14) said received signal so as to transform said received signal from time domain to frequency domain coefficients, dividing respective (18) ones of said frequency domain coefficients by corresponding ones of transform coefficients of the expected transmitted signal associated with said satellite to provide corresponding transform value ratios, and deriving (20, 22) from respective transform value ratios corresponding scaled values of the time delay of the signal between the satellite and the receiver.

The invention directs the search for synchronisation to a small set of chips thereby providing an indication of the identity of the synchronisation sequence. Thus the search for the synchronisation chip is more focused than the prior art method, which results in obtaining synchronisation on average more quickly and more efficiently than in the prior art.

12 Claims, 3 Drawing Sheets

RECEIVER FOR A SATELLITE BASED POSITION LOCATION SYSTEM

BACKGROUND OF THE INVENTION

The present invention relates to a satellite based position location system such as the Global Positioning System (GPS), and in particular to a receiver for use in such a system.

The present invention relates to a satellite based position location system such as the Global Positioning System (GPS), and in particular to a receiver for use in such a system.

Global positioning system (GPS) is one example of a space based satellite navigation system that has the ability to pinpoint any location on earth with a high degree of accuracy, providing information on position, velocity and time (PVT) of a receiver. Other examples of spaced based satellite navigation system are TIMATION, transit, and GLONASS.

GPS is typically divided into three segments:
a space segment which essentially comprises the satellites and the signals they emit,
a control segment which monitors and maintains the satellite constellation,
a user segment which comprises GPS receivers, equipment, data collection and data processing techniques.

The GPS constellation typically consists of 24 satellites orbiting the earth every 24 hours. A minimum of four GPS satellites must be in clear view of a GPS receiver in order for the receiver to determine accurately its location. In overview, each satellite broadcasts signals that the GPS receiver receives and decodes and from these calculates the time taken for the signals to reach the receiver, this is called the time in transit. The receiver then multiplies the time in transit by the speed of electromagnetic radiation to determine the range from the satellite to the receiver. From there, in order to work out the receiver's 3 dimensional distance, velocity and time, the receiver applies the triangulation calculation. Triangulation involves calculating the intersection of points between four reference points given by the satellites and the intersection fixes or locates the position in 3-dimensional space.

It should be noted, however, that range measurement inherently contain errors common to measurements created by the unsynchronised operation of the satellite and the user clocks.

This is why GPS uses four satellites to effect ranging. The measurements from three GPS satellites allow the GPS receiver to calculate the three unknown parameters representing its three dimensional position, while the fourth GPS satellite allows the GPS receiver to calculate the user clock error and therefore determine a more precise time measurement.

The signals broadcast by a satellite comprise radio frequency (RF) ranging codes and navigation data messages which are transmitted using spread spectrum techniques. The ranging codes enable the GPS receiver to measure the transit times of the signals and thereby determine the range between the satellite and the receiver. The navigation data messages are based on predetermined information regarding the orbital path of the satellite and thus provide an indication of the position of the satellite at the time the signals were transmitted.

The encoded signal generated by a satellite is in the form of a pseudo random noise (PRN) code which represents a sequence of random binary chips, each satellite transmitting a unique PRN sequence that repeats itself at definite intervals. In GPS, there is Precision Code (P-Code) having a chipping rate 10.23 MHz and which is reserved for military use, and a Course Acquisition code (C/A Code) having a chipping rate 1.023 MHz and which is allocated for commercial and personal use. A chip is 1 or −1. The codes are transmitted on two L-band frequencies: Link 1 (L1) at 1575.42 MHz and Link 2 (L2) at 1227.6 MHz. The code allocations on L1 are Course Acquisition code (C/A Code) and Precision Code (P-Code), and on L2 is only P-Code The C/A Code consists of a 1023 bit pseudo random (PRN) code, and a different PRN code is assigned to each GPS satellite. In addition, a 50 Hz navigation data message is superimposed on the C/A Code, and contains the data noted above. Thus the receiver can utilise the signal from a satellite by the particular C/A Code being submitted, to make pseudo-range measurements.

Turning now to the receivers, there is a wide range of GPS receivers available today, and typically the internal architecture of a GPS receiver comprises a front end that initially processes the incoming satellite signals, followed by signal processing stages that apply the algorithms to determine the receivers location, speed and time.

The front end in basic terms is similar to that of a superheterodyne receiver. The signal is detected by a GPS antenna and fed to a low noise amplifier. Following amplification, the signal is down converted to a lower workable frequency. This is achieved by mixing or heterodyning the GPS signal with another constant frequency signal. This mixing signal is produced by a local oscillator. When two signals are mixed, the original, the sum of the two and the difference between the two frequencies is output. The filter in the following stages selects only the difference frequency and rejects the others. This difference frequency produced by the down conversion step is known as the intermediate frequency IF. The signal is next converted from analogue to digital in an AD converter. The output level of the AD converter is monitored by a voltage comparator to check levels exceeding or dropping below threshold levels, and an automatic gain control continually adjusts the gain of the IF amplifier to maintain a constant output level. The digital signal from the AD converter is used as an input to several stages of signal processing dealing with the ranging process.

As indicated earlier, the ranging process aims to calculate the distance from the satellite to the receiver using the incoming PRN codes to time how long it has taken the signals transmitted by the satellite to arrive at the receiver. To achieve this, each receiver has the capability to generate an exact pattern of the code that each satellite transmits using a PRN signal generator. The incoming signal received from a particular satellite is likely to be out of phase with the internal one since the time it takes to travel from the satellite to the receiver, measured in units of time periods to transmit a chip may not be always known. The internally generated expected PRN signal from a particular satellite needs to be suitably delayed or phase shifted so that it matches with the received signal when compared. The strength of match can be measured from correlation between the two signal fragments. It is usual to correlate a fragment of the received sequence with a corresponding fragment of the expected signal from the satellite. As the digitised expected signal is periodic, the internally generated sequence can be delayed by rotating the sequence. The amount of shifting or offset that was required to match the two signals provides the receiver with a measurement of the time lag between the signal leaving the satellite and arriving at the receiver. This measurement is then used to derive the range.

In principle, if the time it takes for the signal to travel from the satellite to the receiver via a particular path were known, then would be possible to predict a signal proportional to the signal arriving at the receiver via that path and the output from the correlator would be a large quantity related to the energy in that path. However, this time interval is not known to begin with. It is usual to acquire the exact time of travel for each significant path by using some form of search algorithm. As the signal is cyclic (at least for 20 ms) by shifting the fragment of expected signal by m shift positions, a delay of m multiplied by the sampling period in microseconds can be simulated. Various delays are tried and the output of the correlator is monitored. The delay that is identified as being the one that is appropriate is the one that yields the highest correlation output. If sub chip sampling is employed, (say 4 samples per chip which is currently common) then a high value is obtained for about 4 of the m rotations. The rotation that yields the highest correlation from these four contiguous rotations is used to calculate the time the signal has taken to travel from the satellite to the observer. Once the time has been estimated, the changes in this time are monitored using various tracking algorithms.

SUMMARY OF THE INVENTION

The present invention in one aspect provides a method for determining synchronization of a signal received in a global positioning system receiver and transmitted by a global positioning system satellite, wherein said method comprises the steps of transform coding said received signal so as to transform said received signal from time domain to frequency domain coefficients, dividing respective ones of said frequency domain coefficients by corresponding ones of transform coefficients of the expected transmitted signal associated with said satellite to provide corresponding transform value ratios, and deriving from respective transform value ratios corresponding scaled values of the time delay of the signal between the satellite and the receiver.

Against this background, the present invention in one aspect provides a method for determining synchronisation of a signal received in a global positioning system receiver and transmitted by a global positioning system satellite, wherein said method comprises the steps of transform coding said received signal so as to transform said received signal from time domain to frequency domain coefficients, dividing respective ones of said frequency domain coefficients by corresponding ones of transform coefficients of the expected transmitted signal associated with said satellite to provide corresponding transform value ratios, and deriving from respective transform value ratios corresponding scaled values of the time delay of the signal between the satellite and the receiver.

Other aspects and features of the invention are defined in the claims.

The invention directs the search for synchronisation to a small set of chips thereby providing an indication of the identity of the synchronisation sequence. Thus the search for the synchronisation chip is more focused than the prior art method, which results in obtaining synchronisation on average more quickly and more efficiently than in the prior art.

Moreover, on average the expected time spent in searching for synchronisation is less.

The present invention is particularly advantageous in that it is a deterministic technique and accordingly assists the prediction in time of when the correlation process should end.

BRIEF DESCRIPTION OF THE INVENTION

The present invention will now be described by way of example with reference to the accompany drawings in which.

DETAILED DESCRIPTION OF THE INVENTION

Figure 1:
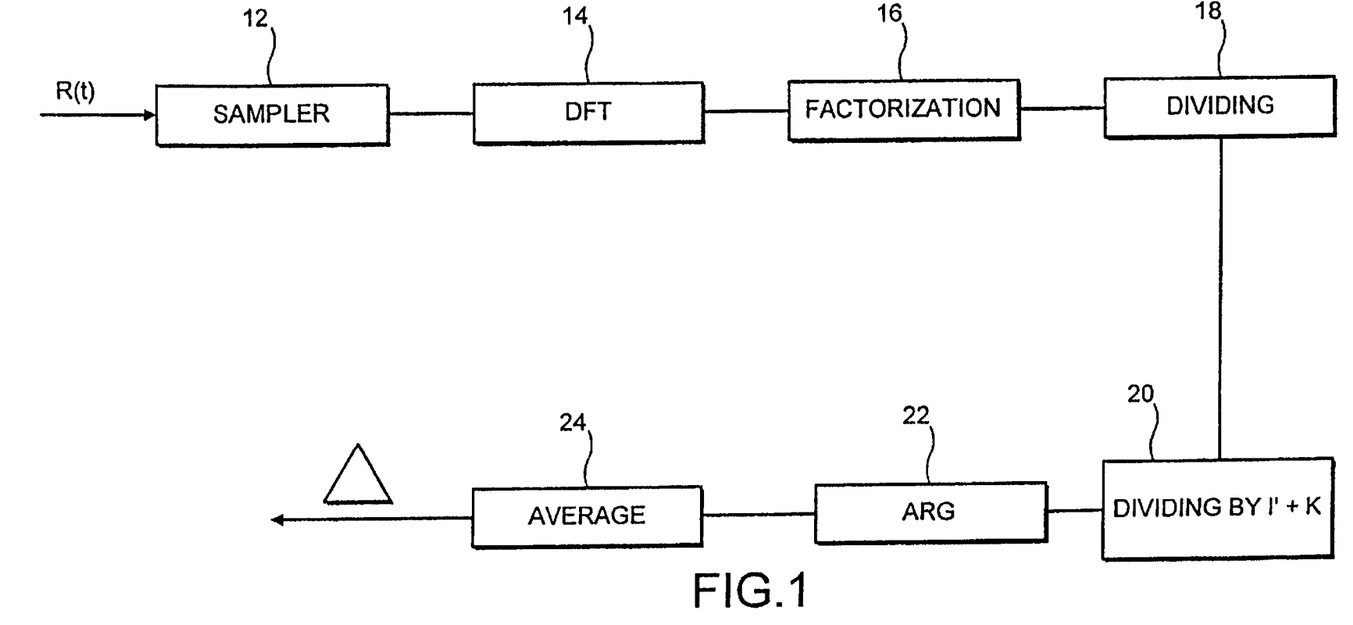
FIG. 1 illustrates in block diagram form a preferred embodiment of the present invention.

As indicated above, the present invention is concerned with the problem of a receiver attaining synchronisation with an incoming satellite transmitted pseudo random noise (PRN) signal in the context of the GPS system. FIG. 1 shows the functional blocks making up a preferred receiver arrangement of the present invention.

The incoming signal received by the receiver is represented as R(t) where t is the ideal time of the transmitted signal.

The receiver initially samples the incoming signal in block 12 by a sampler operating at a sample period T with Nos being the number of samples per chip. The sampler typically operates at sampling rates are 4 samples per chip.

For the purposes of this description, time is measured with respect to the receiver's clock. A sequence of samples of R(t) begins to repeat with a period of M Nos where in GPS M is 1023 chips. R(t) is then given by Eqn 1:

$$R[t]=R[t+M\ Nos\ T]$$

In reaching the receiver, the signal transmitted by the satellite follows more than one path, having reflected off natural or man-made obstacles. Thus, signals arrive along two or more different paths and are separated in time relative to each other. The point of maximum correlation power needs to be determined for each path in order to identify the chip where synchronisation/correlation occurs for each path.

Thus the contribution of a given path having a strength $\alpha(k)$ delayed by $\Delta(k)T$ to the received signal is represented by Eqn 2:

$$\alpha[k]R[t-\Delta[k]T]$$

Then the complete received signal comprising the sum of the signals received via different paths is given by Eqn 3:

$$\sum_k \alpha[k]R[t-\Delta[k]T]$$

where $\Delta(k)$ is an integer between 0 and M Nos $-1$.

The output of block 12 is a sampled received signal. Next, a Discrete Fourier Transform is applied to the received signal in block 14 in FIG. 1. The Discrete Fourier Transform (DFT) maps the signal from the time domain into the frequency domain and this allows for easier processing of the signal. The application of the Discrete Fourier Transform to the received signal follows Eqn 4:

$$\sum_{i=0}^{K\,M\,Nos-1} e^{-\frac{i2\pi i'i}{K\,M\,Nos}} \sum_{k} \alpha[k]R[(i-\Delta[k])T]$$

In this step the i'th bin of the Discrete Fourier Transform of the product of KMNos consecutive samples is computed to output KMNos DFT coefficients. A so-called bin is a sampling point in the frequency domain and is determined by the maximum frequency and the resolution. For efficiency, several bins may be computed together. Eqn 4 yields the value of the i'th bin in a KMNos point DFT.

With the received signal now being presented in the frequency domain as DFT coefficients, in order to demonstrate that the expression for the i'th bin depends on the delay, a series of mathematical manipulations such as factorisation, and changing the order of summation are performed in block 16. The process of factorisation in block 16 in effect serves to simplify the DFT coefficients.

First in block 16 there is an interchanging of the order of summation, i.e. summing over i first and then over k according to Eqn 5:

$$\sum_{k}\left(\sum_{i=0}^{K\,M\,Nos-1} e^{-\frac{i2\pi i'i}{K\,M\,Nos}}(\alpha[k]R[(i-\Delta[k])T])\right)$$

From this equation the expression (herein denoted Eqn 6):

$$e^{-\frac{i2\pi i'\Delta[k]}{K\,M\,Nos}}$$

is factored from the inner sum, so as to isolate a term from dependence on the delay.

This is achieved by the following manipulation according to Eqn 7:

$$\sum_{k}\alpha[k]\left(\sum_{i=0}^{K\,M\,Nos-1} e^{-\frac{i2\pi i'(i-\Delta[k]+\Delta[k])}{K\,M\,Nos}}R[(i-\Delta[k])T]\right)$$

Next is a factoring step given by Eqn 8:

$$\sum_{k}\alpha[k]e^{-\frac{i2\pi i'\Delta[k]}{K\,M\,Nos}}\left(\sum_{i=0}^{K\,M\,Nos-1} e^{-\frac{i2\pi i'(i-\Delta[k])}{K\,M\,Nos}}R[(i-\Delta[k])T]\right)$$

This gives two terms as a product of two factors, one of which includes the dependency of the delay, while the other, which appears to include dependency on the delay, is in fact independent of the delay. This is achieved because the function R(t) is cyclic and the sequence transmitted repeats.

Optimal accuracy of the preferred method is obtained when the bit sequence being transformed in the receiver lies within one duration of the navigational data, although if the expected signal is longer this can be extended.

To show that the inner term is isolated from the delay, a change of variable is made so as to obtain Eqn 9:

$$\sum_{k}\alpha[k]e^{-\frac{i2\pi i'\Delta[k]}{K\,M\,Nos}}\left(\sum_{i=0}^{K\,M\,Nos-1} e^{-\frac{i2\pi i'i}{K\,M\,Nos}}R[i\,T]\right)$$

This is the output of the factorisation process which is then passed to dividing block 18. Here the factorisation block output is divided by the following expression, herein denoted Eqn 10:

$$\sum_{i=0}^{K\,M\,Nos-1} e^{-\frac{i2\pi i'i}{K\,M\,Nos}}R[i\,T]$$

Eqn 10 is a known parameter since it is the Fourier Transform of the ideal transmitted signal, more specifically it is the i'th bin of the Fourier Transform of the ideal transmitted signal. This can be found for example from a look-up table. The division step results in the output of a series of corresponding transform value ratios given by Eqn 11:

$$\sum_{k}\alpha[k]e^{-\frac{i2\pi i'\Delta[k]}{K\,M\,Nos}}$$

The result of Eqn 11 can be calculated as all the variables are known.

The transform value ratios represent the effective amplification of the system at the frequency given by the i'th bin of the Fourier Transform when regarded as a low pass filter and is indicative of each amplified value and relative phase value of the i'th bin. In order to process the calculation a set of bins is selected for example a 256 FT in taken in which there are 256 bins. A fraction of these bins is selected to which the algorithm is applied. For each C/A code, there may be certain bins with greater energy and these are selected preferentially.

Each of these transform value ratios discretely and independently includes the delay required to obtain synchronisation. It should be noted that the delay spread due to multipath propagation between the different bins is much smaller than the delay itself, and this may be expressed in terms of the mean delay and the incremental delay due to multipath propagation as follows in Eqn 12:

$$e^{-\frac{i2\pi i'\Delta}{K\,M\,Nos}}\left(\sum_{k}\alpha[k]e^{-\frac{i2\pi i'\Delta'[k]}{K\,M\,Nos}}\right)$$

Where the expression (herein denoted Eqn 13):

$$\Delta[k]=\Delta+\Delta'[k]$$

The result of the calculation is expected to be noisy and have a large variance, i.e. diverge significantly in the range of values it can assume. From here it is possible to obtain a term that is independent of i'th bin by considering the i'+KNos bin and dividing one expression by the other. This allows the transform value ratios to be treated in a uniform manner so as to drive towards obtaining a series of scaled values.

Hence in block 20 dividing Eqn 12 by the i'+KNos bin results in Eqn 14:

$$\frac{\left(e^{-\frac{i2\pi i'\Delta}{K\,M\,Nos}}\left(\sum_{k}\alpha[k]e^{-\frac{i2\pi i'\Delta'[k]}{K\,M\,Nos}}\right)\right)}{\left(e^{-\frac{i2\pi(i'+K\,Nos)\Delta}{K\,M\,Nos}}\left(\sum_{k}\alpha[k]e^{-\frac{i2\pi(i'+K)\Delta'[k]}{K\,M\,Nos}}\right)\right)}$$

The output of block 20 is a series of corresponding transform value ratio coefficients that are independent of i thus enabling all terms to be treated in a uniform way.

The delay can be estimated from these ratios by taking a weighted average after some processing of these ratios.

In taking a weighted average each processed ratio may be given equal weight. Optionally, the processing can be designed so as to emphasise the result delivered by a particular bin that may be known to be more accurate by weighting that particular bin in accordance with predetermined criteria.

Equ 14 simplifies to Eqn 15

$$e^{-\frac{i2\pi\Delta}{M}} \frac{\left(\sum_k \alpha[k] e^{-\frac{i2\pi i' \Delta'[k]}{K\,M\,Nos}}\right)}{\left(\sum_k \alpha[k] e^{-\frac{i2\pi(i'+K\,Nos)\Delta'[k]}{K\,M\,Nos}}\right)}$$

In Eqn 15 the term (herein denoted Eqn 16)

$$e^{-\frac{i2\pi\Delta}{M}}$$

involving the delay (not the delay spread) is independent of i'th bin

In order to remove noise from this calculation it is necessary to arrive at an expression that can be averaged. Equation 14 is an expression involving complex numbers. The delay can be derived from the phase of the complex number. The determination of the phase is achieved by taking the Argument (Arg) of the result obtained by calculating equation 14. An expression is thereby obtained that can be averaged. This is expressed in a form such that the terms dependent on the delay are separated from the remaining terms.

Equation 15 may be re-expressed as Eqn 17

$$e^{-\frac{i2\pi\Delta}{M}+\mathrm{Arg}\left[\frac{\left(\sum_k \alpha[k] e^{-\frac{i2\pi i'\Delta'[k]}{K\,M\,Nos}}\right)}{\left(\sum_k \alpha[k] e^{-\frac{i2\pi(i'+K\,Nos)\Delta'[k]}{K\,M\,Nos}}\right)}\right]}$$

$$\mathrm{Abs}\left[\frac{\left(\sum_k \alpha[k] e^{-\frac{i2\pi i'\Delta'[k]}{K\,M\,Nos}}\right)}{\left(\sum_k \alpha[k] e^{-\frac{i2\pi(i'+K\,Nos)\Delta'[k]}{K\,M\,Nos}}\right)}\right]$$

Figure 2:
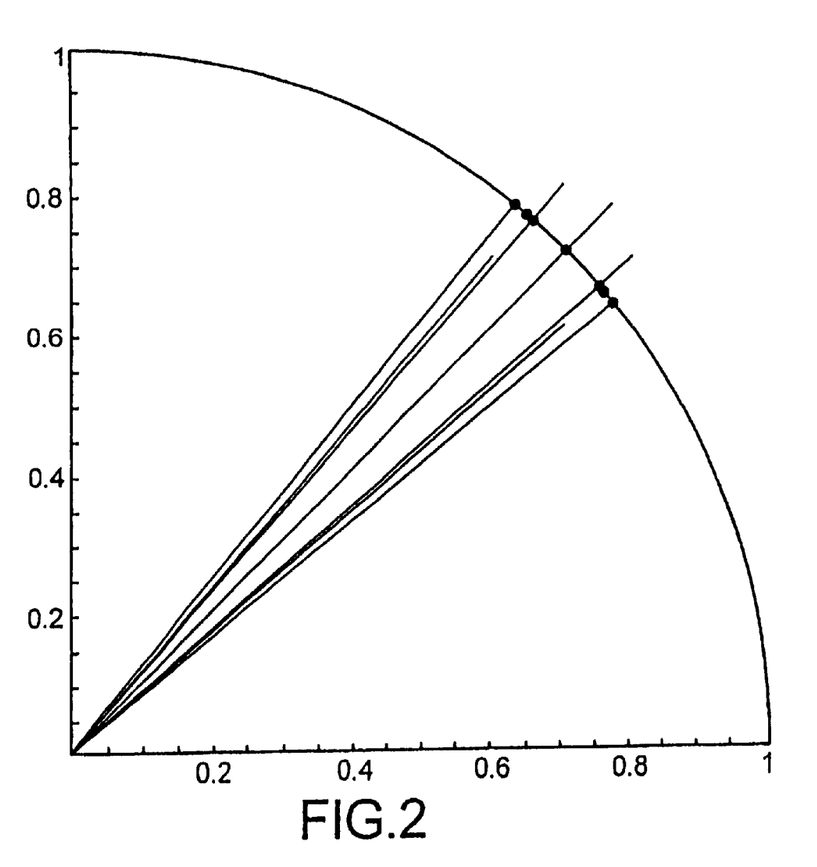
FIG. 2 shows an Argand diagram of a step in the preferred embodiment of FIG. 1.

With reference to FIG. 2, in Eqn 17 the exponent of e is the angle the complex number makes on the unit circle and is indicative of the phase, and is linear function of delay plus a noise term. The value of the term Abs is the radius. Thus the Argument (Arg) of Eqn 17 is taken in block 22 to arrive at Eqn 18:

$$-\frac{2\pi\Delta}{M}+\mathrm{Arg}\left[\frac{\left(\sum_k \alpha[k] e^{-\frac{i2\pi i'\Delta'[k]}{K\,M\,Nos}}\right)}{\left(\sum_k \alpha[k] e^{-\frac{i2\pi(i'+K\,Nos)\Delta'[k]}{K\,M\,Nos}}\right)}\right]$$

The Arg of the transform value ratio coefficients yields noisy scaled values of the time delay and a noise factor. Other operations could be used to obtain the delay from the transform value ratios, such as a non-linear estimation of the delay directly from the transform value ratios. This operation is such that the output is able to be averaged in a manner so as to isolate the time delay so that it can be extracted.

The result of Eqn 18 is dependent on the delay and not the bin number of the Fourier Transform used, and so the operation performed in Eqn 18 leads to an expression that can be regarded as being composed of the sum of two parts: one of which is not random, while the other is random. Because the random number has with a zero mean, this leaves $$\frac{2\pi\Delta}{M}$$

In order to derive an estimate of the mean the results from all bins are added together. Accordingly, it is possible to average over several bins 20,40, 100,1000 etc. If the signal is sufficiently strong it may be possible to obtain a useful result by evaluating for instance only 20 bins. This may be the case when listening to the signal in an open area.

By performing an average in block 24 of this for several different values of i'th bins the result can be used to determine the delay?. Averaging is given by Eqn 19:

$$\frac{\sum_{i' \in II'}\left(-\frac{2\pi\Delta}{M}+\mathrm{Arg}\left[\frac{\left(\sum_k \alpha[k] e^{\frac{i2\pi i'\Delta'[k]}{K\,M\,Nos}}\right)}{\left(\sum_k \alpha[k] e^{-\frac{i2\pi(i'+K\,Nos)\Delta'[k]}{K\,M\,Nos}}\right)}\right]\right)}{\#II'}$$

Where II' is a set of integers between 0 and M and number II' is the number of elements in II'. This can be re-expressed as Eqn 20:

$$\frac{2\pi\Delta}{M}+\frac{\sum_{i' \in II'}\left(\mathrm{Arg}\left[-\frac{\left(\sum_k \alpha[k] e^{\frac{i2\pi i'\Delta'[k]}{K\,M\,Nos}}\right)}{\left(\sum_k \alpha[k] e^{-\frac{i2\pi(i'+K\,Nos)\Delta'[k]}{K\,M\,Nos}}\right)}\right]\right)}{\#II'}$$

Eqn 20 removes the mean. The term below is a zero mean random number (herein denoted Eqn 21):

$$\frac{\sum_{i' \in II'}\left(\mathrm{Arg}\left[\frac{\left(\sum_k \alpha[k] e^{\frac{i2\pi i'\Delta'[k]}{K\,M\,Nos}}\right)}{\left(\sum_k \alpha[k] e^{-\frac{i2\pi(i'+K\,Nos)\Delta'[k]}{K\,M\,Nos}}\right)}\right]\right)}{\#II'}$$

This leaves the expression (herein denoted by Eqn 22):

$$\frac{2\pi\Delta}{M}$$

From which the delay $\Delta$ can be computed.

There now follows a description of an example using the algorithm of the preferred method of the invention.

Initially, some of the functions necessary for the algorithm are set up.

As explained previously, both the satellite and receiver contain a C/A generator that generate the C/A code sequence. The generation of the C/A code in the receiver is set up as follows:

$$M=2^{10}-1$$

1023

G1 register is the state register of the linear feedback shift machine that generates the C/A code Next a baseband version of the Binary Phase Shift (BPS) modulated signal is set up:

BPS[f0_, T_][t_]:=
  Module [{x1, x2, x3, x4},
    x1=t/T//Round;
    x2=Mod[x1, 1023]+1;
      CACode [[x2]]Sin [2 Pi f0 (t−T x1)]]

Figure 3:
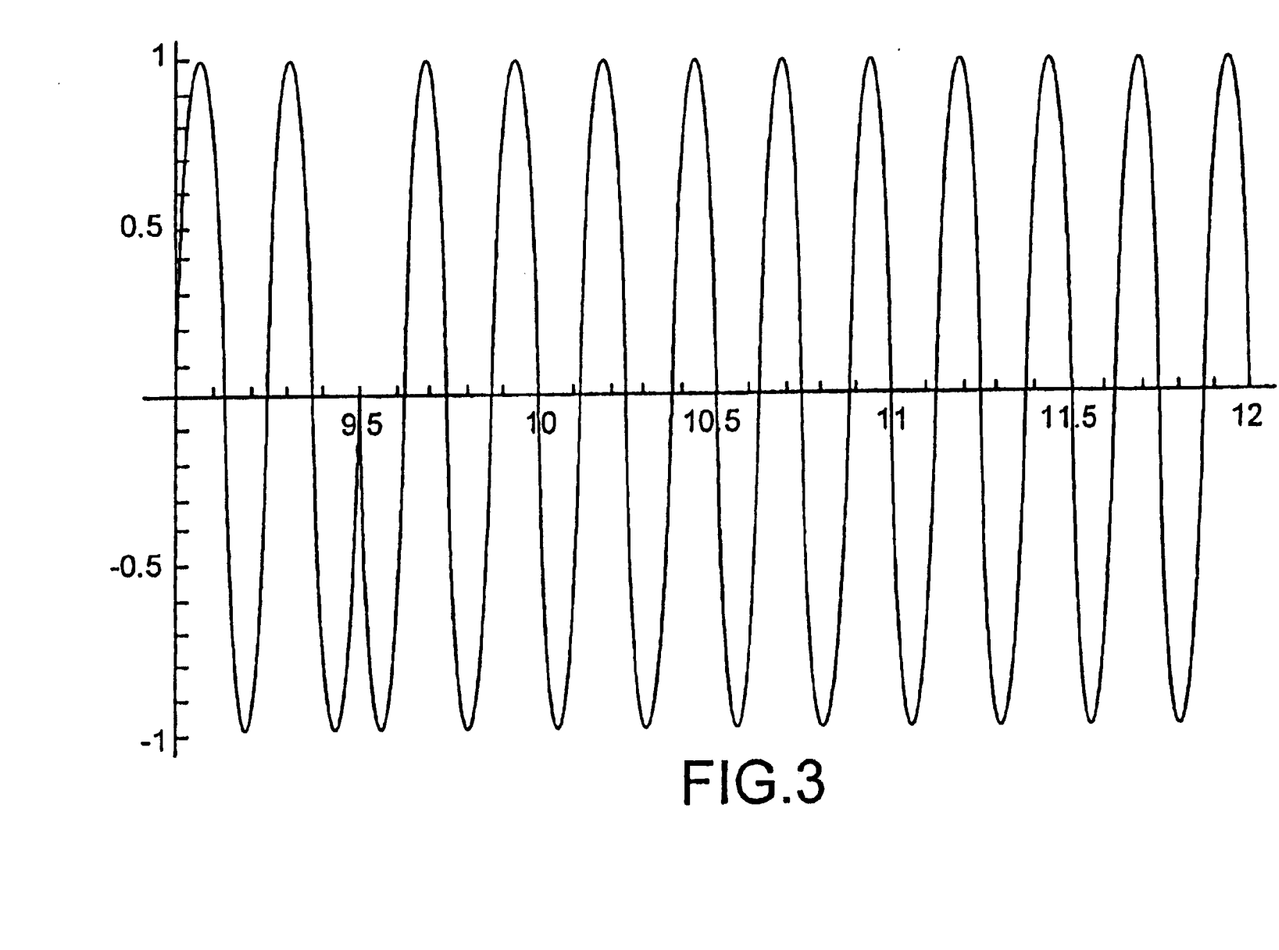
FIG. 3 is a plot of simulation of the present invention.

The output from this subroutine is a sequence of 1023 chips in which the bipolar notation −1 and +1 represents the binary digits 0 and 1 respectively. This is the required C/A code. The C/A sequence modulates the carrier signal using the binary phase shift key (BPSK) scheme, as depicted in FIG. 3.

In order to perform subsequent calculations for the synchronisation algorithm, the system is initialised using the following initialisation conditions.

In the receiver, initialisation begins with generating a sequence that is used for correlation with the received satellite signal. The generated sequence is defined by a set of parameters given by:

$$K=5; M=1023; Nos=16;$$

where M is the number of chips in the sequence, K is the number of repeat sequences of the 1023 chips that are used for correlation of the generated signal with the received signal, and Nos is the oversampling rate.

The Binary Phase Shifted signal modulated for any time in the C/A code given any particular carrier frequency of f0 cycles per chip is given by:

$$BPS[f0, T][t]$$

For example $$R[t\_]:=BPS[20, 1][t]$$

represents the BPS signal (R[t] having a frequency of f0=20, i.e. a carrier frequency of 20.46 MHz, and period t=1.

What is required is the Fourier Transform of the expected sampled sequence of the transmitted signal. In order to obtain this consecutive samples are taken of the function R(t) which is the function that is generated by a satellite with the appropriate C/A code.

$$SampR=Table[R[t], \{t, 0, KM, 1/Nos\}]/N;$$

This generates a sequence of samples with a step size/sampling period of 1/16, where t runs from t=0 to t=KM (5*1023). The sequence that results is the sequence that is to be transformed in accordance with Eqn 10.

In order to perform successive correlation until the synchronisation point is found, the Discrete Fourier Transform (DFT) of the sequence is pre-calculated and stored for recall, with the resulting coefficients derived from the spectrum being resolved into frequency bins and provided in a look-up table. The receiver calculates the DFT of this sequence by sampling the data using the initialisation data defined by the sample sequence above.

$$FourierSampR=Fourier[SampR];$$

To do this, a set of values (Iset) must be defined and are chosen arbitrarily as multiples of KNos. As mentioned previously, a set of bins to be used is selected, the selected set being given by:

$$Iset=Table [i \, K \, Nos, \{i, 500, 520\}]$$

{40000, 40080, 40160, 40240, 40320, 40400, 40480, 40560, 40640, 40720, 40800, 40880, 40960, 41040, 41120, 41200, 41280, 41360, 41440, 41520, 41600}

The list of values generated by K*Nos run from 500 to 520.

The next Iset consists of the set of bins that are I+K*Nos for every i in the Iset. This is the set of bins which will be necessary to be used in Eqn 14 above for the division to obtain transform value ratio coefficients.

$$NextIset=Iset+KNos$$

{40080, 40160, 40240, 40320, 40400, 40480, 40560, 40640, 40720, 40800, 40880, 40960, 41040, 41120, 41200, 41280, 41360, 41440, 41520, 41600, 41680}

In NextIset each i is incremented by KNos ie 80.

The frequency bins in SampR specified by Iset are pre-calculated as follows and are denoted x3:

$$x3Pre=Map[FourierSampR[[\#+1]]\&, Iset];$$

x3Pre=Map . . . are the values of the DFT bins selected in the Iset of the expected transmitted signal.

Similarly, the frequency bins in SampR specified by NextIset are precalculated as follows and are denoted by x4:

$$x4Pre=Map[FourierSampR[[\#+1]]\&, NextIset];$$

x4Pr=Map . . . are the values of the DFT bins selected in the NextIset of the expected transmitted signal.

As noted above, to reach the receiver, the transmitted signal follows more than one path, as a result of reflections. Thus, the received signal may contain two or more different contributions separated in time relative to each other. In this example, the received signal is considered as receiving contributions from three paths with delays: 81/Nos T, 85/Nos T and 87/Nos T, which leads to a composite BPS signal given by:

$$s[t\_]:=0.6BPS[4, 1][t-81/Nos]+0.5BPS[4, 1][t-85/Nos]+0.3BPS[4, 1][t-87/Nos];$$

This affords prior knowledge of what the delay is and can be used to ascertain whether the algorithm can detect the synchronisation point in the region encompassing the delay. In other words, an example of the signal that may be received can be simulated, and having chosen the delays, the delays in the received signal are known and hence it can be demonstrated that the algorithm identifies the delay correctly.

The following Steps 1 to 11 are then carried out on the received signal in order to determine the synchronisation position.

Step 1. Collect a sequence of consecutive samples of S[t] taken with sampling period of T/Nos in accordance with:

$$Samp=Table[S[t], \{t, 0, KM, 1/Nos\}]/N;$$

Step 2. Take the Discrete Fourier Transform of the sequence:

$$FourierSamp=Fourier[Samp];$$

Step 3. In order to carry out successive correlations, frequency bins, denoted by x1, are selected from Fourier-Samp specified by Iset:

$$x1=Map[FourierSamp[[\#+1]]\&, Iset];$$

Step 4. Similarly, frequency bins are selected from FourierSamp, denoted by x2, specified by NextIset:

$$x2=Map[FourierSamp[[\#+1]]\&, NextIset];$$

Step 5. By term-wise division of the x2 term by x4Pre, denoted by x5, the output of the transformed values is a vector/matrix of complex vectors:

$$x5=x2/x4Pre$$

{−0.874749−1.02515 i, −0.202363−1.33717 i, 0.445951−1.34501 i, 1.08473−0.885506 i, 1.32625−0.257484 i, 1.28834+0.460147 i, 1.00347+1.01611 i, 0.296162+1.28706 i −0.281232+1.36068 i, −0.99733+1.11484 i, −1.38638+0.8375 i, −1.41416+0.322581 i, −0.98579−0.759362 i, −0.509537−1.34928 i, 0.349951−1.43848 i, 0.866219−1.02899 i, 1.36766−0.392273 i, 1.40553+0.305918 i, 1.01739+0.915068 i 0.485406+1.26834 i, −0.254314+1.38606 i}

Step 6. Similarly, term-wise division of the x1 term by the x3Pre term, denoted by x6, yields a vector/matrix of complex vectors:

$$x6=x1/x3Pre$$

{−1.2868−0.52127 i, −0.874749−1.02515 i, −0.202363−1.33717 i, 0.445951−1.34501 i, 1.08473−0.885506 i, 1.32625−0.257484 i, 1.28834+0.460147 i, 1.00347+1.01611 i, 0.296162+1.28706 i, −0.281232+1.36068 i, −0.99733+1.1484 i, −1.38638+0.8375 i, −1.41416+0.322581 i, −98579−0.759362 i, −0.509537−1.34928 i, 0.349951−1.43848 i, 0.866219−1.02899 i, 1.36766−0.392273 i, 1.40553+0.305918 i, 1.01739+0.915068 i, 0.485406+1.26834 i}

Step 7. The x5 term is divided by the x6 term to give a complex vector x7 from which the arguments can be calculated:

$$x7=x5/x6$$

{0.861189+0.447805 i, 0.852269+0.529835 i, 0.934001+0.474851 i, 0.834068+0.52994 i, 0.849991+0.456508 i, 0.871216+0.516095 i, 0.940595+0.452749 i, 0.786973+0.485721 i, 0.956289+0.438558 i, 0.954698+0.535643 i, 1.01339+0.327148 i, 0.850303+0.280982 i, 0.546177+0.661556 i, 0.986098+0.609128 i, 0.847329+0.579344 i, 0.813669+0.404229 i, 0.877949+0.590064 i, 0.890294+0.479033 i, 0.826401+0.471178 i, 0.883589+0.451936 i, 0.886267+0.539692 1}

Step 8. The argument of each element of this expression yields:

$$x8=Arg[x7]$$

{0.479507, 0.556205, 0.470349, 0.56602, 0.492865, 0.534801, 0.448611, 0.552972, 0.429986, 0.511295, 0.312264, 0.319153, 0.880642, 0.553344, 0.599722, 0.461082, 0.591751, 0.493631, 0.518187, 0.472787, 0.546975}

Step 9 The average of the above is then found $$x9=Apply[Plus, x8]/Length[x8]$$

0.513912

Step 10. Multiply by M and divide by $2\pi$ $$x10=x9M/(2\ Pi)//i\ N$$

83.6728

Step 11 Round to find the time delay in units of T/Nos.

$$x11=Round[x10]$$

84

The present invention may be embodied in other specific forms without departing from its essential attributes. Reference should thus be made to the appended claims and other general statements herein rather than to the foregoing description as indicating the scope of invention.

For example although in the above example the computations were expressed in terms of complex numbers, analogous computational demonstrations would be readily apparent to those skilled in the art. For example equivalent computations may be made in terms of in-phase I and quadrature Q channels, and in this context determinations can be made of the phase shift therebetween.

Alternatively, a bank of filters may be used and the phase between the received filtered signal and ideal signal may be computed. In this arrangement the signal is passed through a bank of digital filters which serves to separate the different energies present in the different bands so that the received signal can be split into individual component energies. Ratios may be obtained by combining selected ones of the bands in an appropriate manner. Then the band ratios may be processed in an appropriate manner to acquire a delay figure.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A method for determining synchronisation of a signal received at a global positioning system receiver and transmitted by a global positioning system satellite, wherein said method comprises the steps of transform coding said received signal so as to transform said received signal from time domain to frequency domain coefficients, dividing respective ones of said frequency domain coefficients by corresponding ones of transform coefficients of the expected transmitted signal associated with said satellite to provide corresponding transform value ratios, and processing said transform value ratios so as to provide corresponding scaled values that are indicative of the time delay of the signal travelling between the satellite and the receiver.

2. A method according to claim 1, comprising deriving a mean of the scaled values of the time delay.

3. A method according to claim 2, wherein said step of processing said transform value ratios comprises taking the Argument of coefficients of the transform value ratios so as to provided said corresponding said scaled values.

4. A method according to claim 3, wherein said step of transform coding said received signal comprises applying a Discrete Fourier Transform.

5. A method according to claim 4, wherein said transform coefficients of the expected transmitted signal comprise Discrete Fourier Transform coefficients of said expected transmitted signal.

6. A method according to claim 5, wherein said transform value ratios are divided by factors thereof so as to provide transform value ratio coefficients.

7. A method of performing synchronisation for a receiver operating in a global positioning system comprising a plurality of satellites transmitting ranging signals, said synchronising being performed with respect to said transmitted ranging signals and comprises the steps of transform coding said received signal so as to transform said received signal from time domain to frequency domain coefficients, dividing respective ones of said frequency domain coefficients by corresponding ones of transform coefficients of the expected transmitted signal associated with said satellite to provide corresponding transform value ratios, and processing said transform value ratios so as to provide corresponding scaled values that are indicative of the time delay of the signal travelling between the satellite and the receiver.

8. A receiver for a satellite based positioning system operable so as to synchronise with respect to a received signal transmitted from a satellite of said system, said synchronisation comprising transform coding means for transform coding said received signal so as to transform said received signal from time domain to frequency domain coefficients, dividing means for dividing respective ones of said frequency domain coefficients by corresponding ones of transform coefficients of the expected transmitted signal associated with said satellite to provide corresponding transform value ratios, and processing means for processing said transform value ratios so as to provide corresponding scaled values that are indicative of the time delay of the signal travelling between the satellite and the receiver.

9. A satellite based positioning system in which a plurality of satellites transmit ranging signals and a receiver receives the transmitted ranging signals and performs synchronisation with respect to said ranging signals, said synchronisation comprising transform coding means for transform coding said received signal so as to transform said received signal from time domain to frequency domain coefficients, dividing means for dividing respective ones of said frequency domain coefficients by corresponding ones of transform coefficients of the expected transmitted signal associated with said satellite to provide corresponding transform value ratios, and processing means for processing said transform value ratios so as to provide corresponding scaled values that are indicative of the time delay of the signal travelling between the satellite and the receiver.

10. A computer program on a carrier for synchronising a receiver operating in a global positioning system comprising a plurality of satellites transmitting ranging signals, said synchronising being performed with respect to said transmitted ranging signals and comprises transform coding means for transform coding said received signal so as to transform said received signal from time domain to frequency domain coefficients, dividing means for dividing respective ones of said frequency domain coefficients by corresponding ones of transform coefficients of the expected transmitted signal associated with said satellite to provide corresponding transform value ratios, and processing means for processing said transform value ratios so as to provide corresponding scaled values that are indicative of the time delay of the signal travelling between the satellite and the receiver.

11. A computer program product operable to synchronise a receiver operating in a global positioning system comprising a plurality of satellites transmitting ranging signals, said synchronising being performed with respect to said transmitted ranging signals and comprises transform coding means for transform coding said received signal so as to transform said received signal from time domain to frequency domain coefficients, dividing means for dividing respective ones of said frequency domain coefficients by corresponding ones of transform coefficients of the expected transmitted signal associated with said satellite to provide corresponding transform value ratios, and processing means for processing said transform value ratios so as to provide corresponding scaled values that are indicative of the time delay of the signal travelling between the satellite and the receiver.

12. A portable radio communication device including a transceiver for cellular communication and a receiver for a satellite based positioning system operable so as to synchronise with respect to a received signal transmitted from a satellite of said system, said synchronisation comprising transform coding means for transform coding said received signal so as to transform said received signal from time domain to frequency domain coefficients, dividing means for dividing respective ones of said frequency domain coefficients by corresponding ones of transform coefficients of the expected transmitted signal associated with said satellite to provide corresponding transform value ratios, and processing means for processing said transform value ratios so as to provide corresponding scaled values that are indicative of the time delay of the signal travelling between the satellite and the receiver.

* * * * *